May 25, 1965

T. B. SHAW 3,185,762

CABLE CONNECTORS

Filed Dec. 21, 1962

Truman B. Shaw,
Inventor.
Koenig, Pope, Lenniger and Powers
Attorneys.

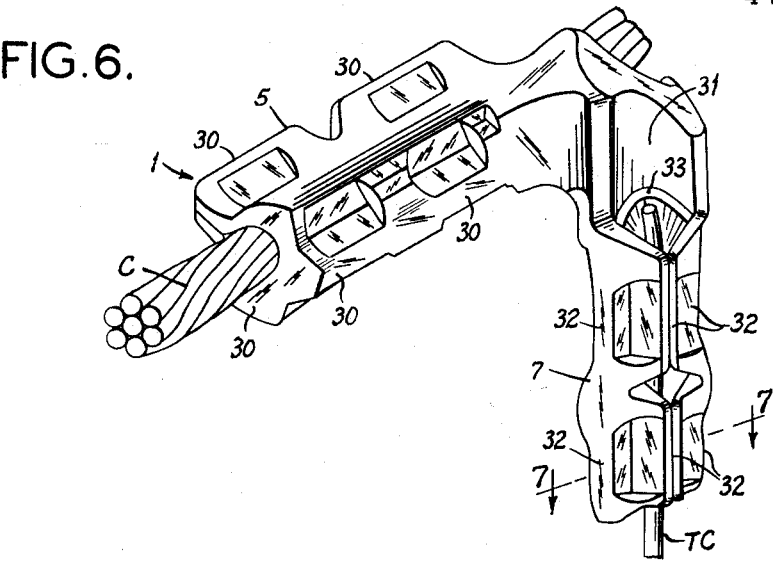
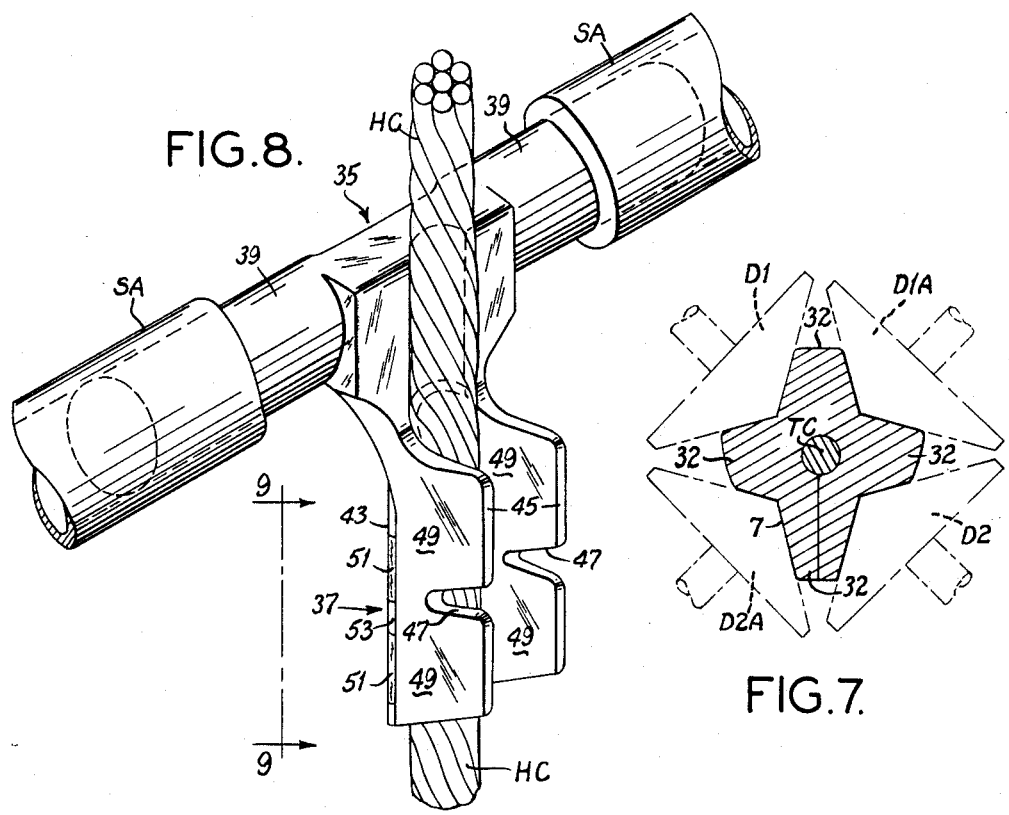

May 25, 1965  T. B. SHAW  3,185,762
CABLE CONNECTORS

Filed Dec. 21, 1962  4 Sheets-Sheet 3

May 25, 1965  T. B. SHAW  3,185,762
CABLE CONNECTORS
Filed Dec. 21, 1962  4 Sheets-Sheet 4
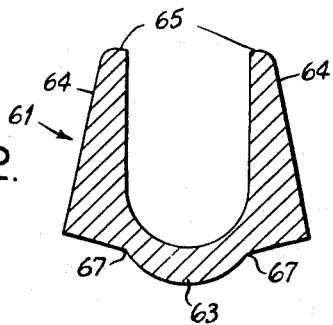
FIG.12.
FIG.13.
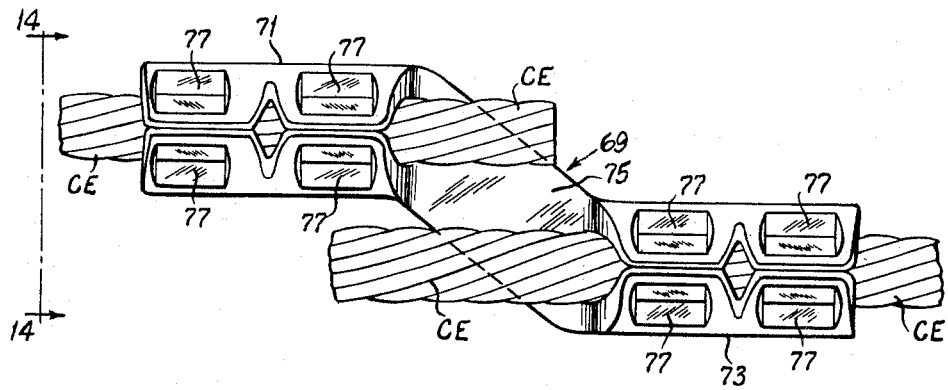
FIG.14.
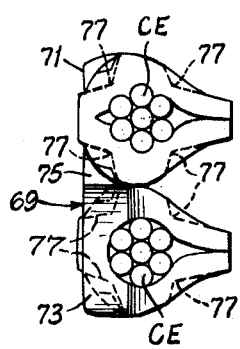

United States Patent Office 3,185,762
Patented May 25, 1965

3,185,762
CABLE CONNECTORS
Truman B. Shaw, Montevallo, Ala., assignor to Anderson Electric Corporation, Leeds, Ala., a corporation of Alabama
Filed Dec. 21, 1962, Ser. No. 246,512
18 Claims. (Cl. 174—71)

This invention relates to cable connectors, and more particularly to cable connectors especially adapted to be crimped about a cable along the length thereof.

Among the several objects of this invention may be noted the provision of cable connectors which may be easily and rapidly crimped about a cable anywhere along its length; the provision of such cable connectors which will permit connecting a branch or tap connector to a conductor or cable intermediate the ends thereof; the provision of connectors of the class described which are capable of joining or interconnecting extremely wide ranges of conductor sizes thereby minimizing connector stocking requirements; the provision of lateral entry cable connectors which are formed of a malleable material for crimping by dies of 4-way compression crimping tools to tightly grip a cable and provide an excellent mechanical connection of high electrical conductivity; and the provision of an easily crimped connector which is economical to manufacture and reliable in use. Other objects and features will be in part apparent and in part pointed out hereinafter.

Briefly, my invention comprises a cable connector adapted to be crimped in the general shape of a cruciform and having a malleable body with a generally U-shaped cable groove defined by a base and side members integral therewith. The connector body has recesses located generally at the junctures of the side members and base with the distance from the recesses to the free outer ends of the side members being somewhat greater than the span or distance between the recesses.

The invention accordingly comprises the constructions hereinafter described, the scope of the invention being indicated in the following claims.

In the accompanying drawings, in which several of various possible embodiments of the invention are illustrated, FIG. 1 is a perspective view of one embodiment of a connector of the present invention showing a pair of cables connected to each other in a right-angular relationship;

FIG. 6 is a perspective view of the connector of FIG. 1 shown fully crimped;

FIG. 7 is a cross section of the other leg of the crimped connector of FIG. 6 taken along line 7—7 of FIG. 6 and showing the dies of the crimping tools in dashed lines;

FIG. 8 is a perspctive view of another embodiment of my invention in which a T-shaped connector is provided;

FIG. 12 is a cross section of the connector shown in FIG. 11 taken on line 12—12 of FIG. 11;

FIG. 13 is a plan view of still another connector embodiment which has a pair of parallel cable grooves with the connector being shown crimped about a pair of parallel cables; and FIG. 14 is an elevation of the connector shown in FIG. 13 looking generally along line 14—14 of FIG. 13.

Corresponding reference characters indicate corresponding parts throughout the several views of the drawings.

Figure 1:
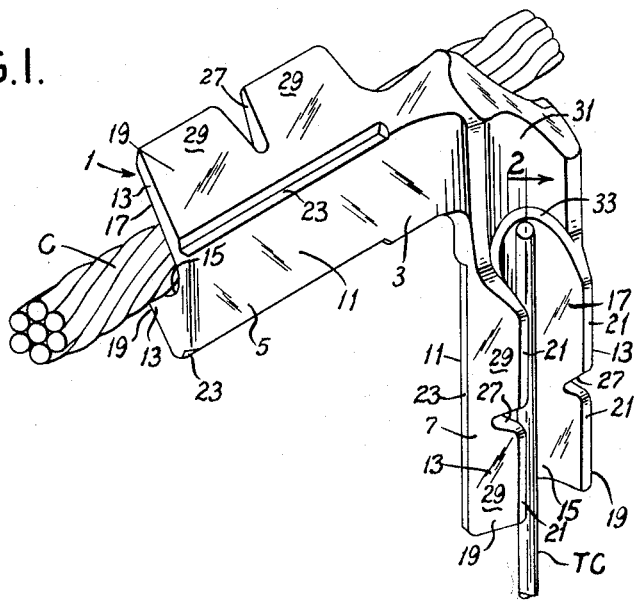
Figure 2:
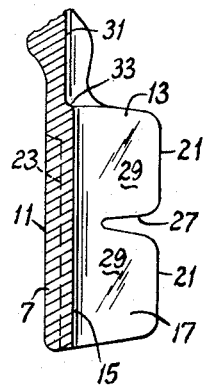
FIG. 2 is a longitudinal section taken generally along line 2—2 of FIG. 1.
Figure 3:
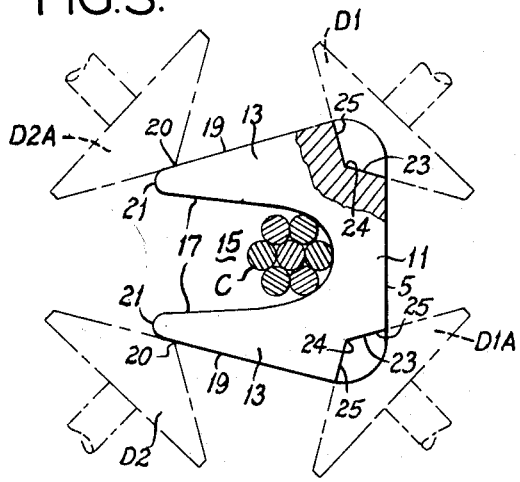
FIG. 3 is an end elevation, partially in section, of one of the legs of the connector shown in FIG. 1 with the dies of a crimping tool being shown in dashed lines in their initial position for crimping.

Referring now more particularly to FIGS. 1–7, one embodiment of a cable connector of this invention is indicated generally by reference numeral 1. This connector includes a body 3 having legs 5 and 7 at right angles to each other. Body 3 is formed of any suitable malleable material, such as aluminum or aluminum alloys, which may be crimped by compression crimping tools, such as for example the type disclosed in copending application Serial No. 115,625, now Patent Number 3,154,981 filed June 8, 1961. Where the connector is to be used to join electrical conductors or cables, the body is formed by conventional casting processes or the like of a metallic material that is not only malleable but has high electrical conductivity. Legs 5 and 7 are identical in their uncrimped condition, each comprising a base 11 with side members 13 meeting or merging with base 11 and being integral therewith. A generally U-shaped cable groove 15 is defined by the inner surfaces 17 of the side members and the base, so that the leg 5 may be positioned to receive an intermediate portion of a long length of electrical conductor or cable such as indicated at C, which is shown in FIGS. 1–7 as a stranded type cable such as ACSR. An electrical tap or branch connection is made by means of leg 7 to a branch or tap cable TC which is exemplarily shown as a solid single conductor. The inner surfaces 17 are generally parallel while the outer surfaces 19 of side members 13 taper from base 11 to free outer ends 21. Alignment recesses or identations 23 are provided generally at the junctures of the outer surfaces of base 11 with side members 13. These recesses 23 are engageable by two crimping dies or nibs D1 and D1A of a four-die crimping tool of the type noted above, and also indirectly position two remaining tool dies D2 and D2A so that they respectively contact the outer surfaces 19 of side members 13 at points 20 adjacent their free ends 21, as illustrated in FIG. 3. Dies D1 and D2 constitute a first pair of oppositely directed crimping nibs, while dies D1A and D2A constitute a second identical oppositely directed pair of compression tool nibs. Recesses 23 comprise generally flat connecting surfaces 25 which meet or join each other at an included angle of about 120°. Also, the outer faces of the dies meet at an included angle of about 120°. It is to be understood that the included angle of the faces of the tool dies or nibs may be more or less than 120°, but preferably more than about 90°. Similarly the surfaces 25 of recesses 23 may meet at an included angle of more or less than 120°. The span or distance between the innermost portions 24 (i.e., the lines of junctions of surfaces 25) of recesses 23 is slightly less than the distance from the recesses to the free outer ends 21 of side members 13.

Each side member 13 has a slot 27 opening at the free outer ends 21 and dividing side member 13 into two crimping sections 29. The length of each section 29 in the direction of cable C is such that it may be easily folded and crimped by dies D1, D2, D1A and D2A of the crimping tool and is therefore about the same width as (or somewhat greater than) that of the crimping dies. These dies are arranged in a right-angular relation to each other with the tips of the dies forming a square (if connected by lines), i.e., each die is equidistant relative to its adjacent nibs. Thus, when recesses 23 are engaged by dies D1 and D1A, as shown, the outer surfaces of side members 13 are adapted to be engaged by dies D2 and D2A at points 20 so that the connector 1 is lightly but positively gripped by the crimping tool.

Figure 4:
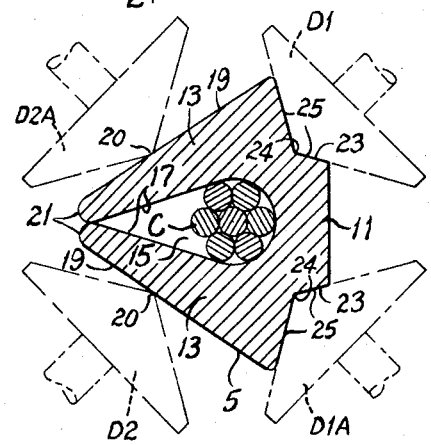
FIG. 4 is a cross section of the leg shown in FIG. 3 at an intermediate stage of crimping with the dies of the crimping tool deforming the connector.
Figure 5:
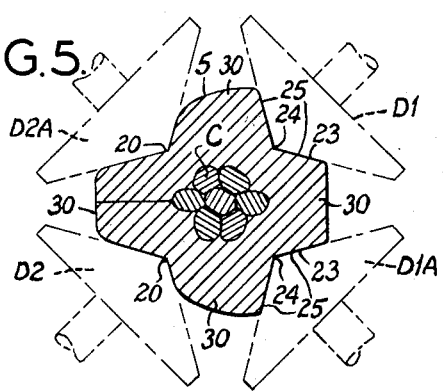
FIG. 5 is a cross section of the leg shown in FIG. 4 after crimping, with the dies of the crimping tool shown in dashed lines.

In making a tap or branch connection to a main cable the lineman usually first effects a crimped connection between the end of the branch conductor and one leg of the connector illustrated in FIGS. 1–7. Then with the dies of the compression tool lightly gripping points 20 and 24 of one of the crimping sections 29 of the other leg and with the groove 15 of this leg opening toward the mouth in the compression tool head, he positions the connector so that the main cable C lies snugly within groove 15. FIG. 3 illustrates this with leg 5 in position about an intermediate portion of main cable C and dies D1, D1A, D2 and D2A in proper position adjacent a crimping section 29 and generally centrally thereof. The compression tool is actuated by the lineman to move dies D1, D1A, D2 and D2A inwardly substantially simultaneously and to maintain substantially a right-angle relationship between adjacent dies, thereby folding side members 13 together and biting into base 11 as shown in FIG. 4 at an intermediate crimped position of the connector 1. Cable C is retained within the cable groove by the initial folding of side members 13 together, thereby to hold cable C within the cable groove upon further compressive action. It should be noted that in the present embodiment the thickness of base 11 adjacent the bottom of the cable groove is substantially the same as the thickness of side members 13 at one-half the height of the cable groove, thereby to provide a suitable proportion between the base and sides for properly crimping the connector. Continued actuation of the dies further deforms the malleable material from which the connector is formed and likewise the cable if it is formed of a relatively malleable material, to a final or completed crimped section as shown in FIG. 5 in which leg 5 is shaped about cable C in the form of a cruciform with four longitudinally extending ribs 30. After the first crimping section 29 has been crimped to a predetermined pressure by the four-way compression tool, the die jaws are released and retracted. Then, the tool is positioned with the dies contacting points 20 and 24 of the other crimping section 29 and the same procedure is repeated. Thus, connector 1 is now crimped about stranded cable C of a relatively large diameter to provide a good tight mechanical connection of high electrical conductivity.

It will be noted that the cross section of the crimped connection between leg 5 and cable C illustrated in FIG. 5 and that between leg 7 and the relatively small diameter branch or tap cable TC illustrated in FIG. 7 are both generally cruciform. However, because of the differences in cross section dimension and the differences in malleability of ACSR and the single copper conductor of tap cable TC, there are minor differences in the specific shapes of these cross sections. For example, longitudinally extending ribs 32 of leg 7 are somewhat deeper and thinner than ribs 30 of leg 5. In the fully crimped condition, highly effective joints of high mechanical strength and maximum electrical contact area are respectively formed between leg 7 and branch cable TC and leg 5 and main cable C. The ribs 30 and 32 function to prevent relaxation of the crimped connections.

Under certain conditions base 11 of connector 1 may during crimping become deformed along the longitudinal axis of the cable groove as well as transversely of the cable groove. Such deformation could cause some misalignment of the cable in the cable groove. Thus, a step or ledge 33 is optionally formed in cable groove 31 adjacent the end of side members 13 and thereby provides a clearance in the cable groove so that a slight bowing of the connector will not cause the cable to be moved upwardly out of the bottom of the groove.

The cross sections shown in FIGS. 5–7 are merely typical cross sections of crimped connectors of the present invention and it is to be understood that there may be considerable variations in the shape of crimped cross sections as the specific cross-sectional shape depends on several variables, such as the hardness and type of material from which the connectors and cables are formed, the size and initial shape of the connectors and cables, and the amounts of compressive force applied by the crimping tool. When the metal of which the cable is formed is of substantially the same or less hardness than the metal from which the connector is formed, there is a cold flow or coining of the metal in the cable when the connector is being crimped thereabout as well as a deformation of the malleable material from which the connector is formed.

While legs 5 and 7 have been shown as having two crimping sections 29, it is understood that any number of crimping sections may be provided, depending upon the size of the cable C about which the connector is crimped and other factors. It is further to be understood that my connector may be crimped along the length of cables which are not electrically conductive, such as ship cables. Also, it should be noted that the term "taper" or "tapering" as used herein includes an irregular taper, such as stepped portions, as well as the regular taper shown in the drawings.

Figure 9:
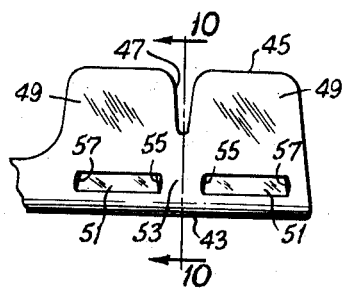
FIG. 9 is a fragmentary side elevation of the leg of the connector shown in FIG. 8 looking generally along line 9—9 of FIG. 8.
Figure 10:
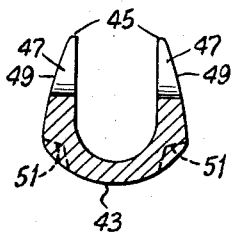
FIG. 10 is a cross section taken on line 10—10 of FIG. 9.

Referring now to FIGS. 8–10 in which another embodiment of a connector of this invention is shown, a T-shaped connector 35 has a leg 37 and arms 39. In this embodiment arms 39 are adapted to be interconnected to the ends of two cables by means of sleeve type connectors SA, which may be crimped by the compression tool of the above-noted application. Leg 37 is adapted to be crimped about a cable HC. This leg 37 comprises a body having a base 43 and joining or connecting side members 45 which are integral therewith. Slot 47 opens outwardly and divides each side member 45 into two crimping sections 49. An alignment recess 51 is arranged generally at the joining of side members 45 with base 43 and is separated by a partition or divider 53 which forms intermediate shoulders 55. End shoulders 57 defining outer ends of recesses 51 are formed by the body of connector 35. Thus, dies may be accurately aligned with respect to each crimping section 49 since shoulders 55 and 57 will aid in positioning the dies within recesses 51.

Figure 11:
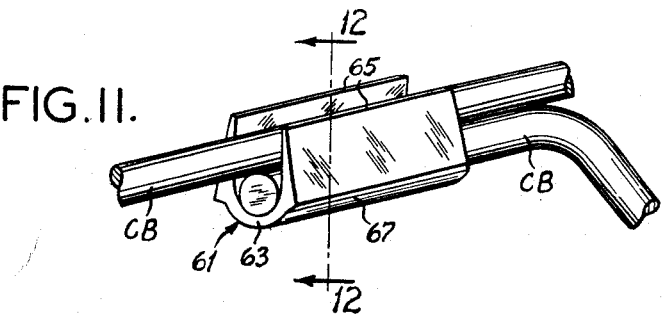
FIG. 11 is a perspective of a further connector embodiment of my invention for interconnecting a pair of parallel cables.

In FIGS. 11 and 12, a further connector embodiment of my invention is shown in which a connector having a single cable groove therein is indicated generally by reference numeral 61 and is adapted to crimp-connect a pair of parallel cables CB within the cable groove. Connector 61 comprises a body formed of a base 63 and merging side members 65. Recesses 67 to locate or position the dies of a crimping tool are provided generally at the junctures of side members 65 with base 63. The connector shown in FIG. 11 may be crimped in the same manner as the embodiment of FIGS. 1–7, although one pair of dies will contact side members 65 before the other pair of dies is fully seated within recesses of side members 65. In this embodiment it will be noted that innermost portions of recesses 67 are more closely spaced (relative to the spacing between the outer surfaces 64 of the side members 65 adjacent their free ends) than in preceding connector embodiments.

FIGS. 13 and 14 relate to still another embodiment of my invention in which a connector 69 has a pair of parallel legs 71 and 73 connected by a cross member 75, and parallel cables CE of a relatively large diameter are positioned within the cable grooves of legs 71 and 73. These legs are shown crimped about cables CE in the shape of a cruciform with indentations 77 indicating the final crimping position of the dies of the crimping tool.

It will be understood that the several connector embodiments specifically described are merely exemplary of the many possible connector configurations embodying my invention.

From the foregoing, it will be understood that a cable connector has been provided having a malleable body with a generally U-shaped cable groove defined by a base and side members integral therewith, with the body having recesses positioned generally at the junctures of the side members and the base. These recesses and the outer surfaces of the side members adjacent their free outer ends are adapted to receive the dies of a four-way crimping tool so that upon inward movement of the dies, the side members are folded into contact with the cable and the base is deformed therewith to effect a cruciform shaped crimped connection of the cable and connector.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A cable connector adapted for being crimped to effect a generally cruciform crimp, said connector in its uncrimped state comprising a malleable body having a base and side members integral with the base and adapted to receive a cable in the space defined by the base and said side members, said side members each having an end joined to the base and a free outer end away from the base, said body having recesses located exteriorly thereof generally at the junctures of the side members and the base, the span between the innermost portions of the recesses being less than the distance from the innermost portions of the recesses to the free outer ends of the side members, the distance between the innermost portions of the recesses being substantially the same as the distance between the outer surfaces of the side members adjacent their free ends.

2. A cable connector as set forth in claim 1 in which the space defined by the base and side members comprises a cable-receiving groove, and the recesses extend in the direction of the cable groove generally along the junctures of the side members and the base.

3. A cable connector as set forth in claim 1 in which the space defined by the base and side members comprises a cable-receiving groove and in which each side member has at least one slot opening at its free end and extending toward the base to divide each side member into at least two crimping sections whereby each section may be individually crimped by a crimping tool about a cable in the cable-receiving groove.

4. A cable connector as set forth in claim 3 in which the recesses extend in the direction of the cable-receiving groove generally along the junctures of the side members and the base with partitions interrupting the recesses intermediately of their length generally adjacent the slots in the side members whereby dies of a crimping tool may be accurately aligned in the recesses adjacent each of the crimping sections.

5. A cable connector as set forth in claim 1 in which the connector is formed of an electrically conductive material, and in which each of said recesses is defined by a pair of generally flat surfaces meeting each other at an included angle of at least approximately 90°.

6. A cable connector as set forth in claim 1 in which said malleable body is generally U-shaped in cross section.

7. A lateral entry cable connector adapted for being crimped by means of a crimping tool having two pairs of oppositely directed dies operable to effect a generally cruciform crimp, said connector in its uncrimped state comprising a malleable body generally of U-shape in cross section thereby having a base and side members integral with the base and a cable-receiving groove defined by the base and said side members, said side members each having an end joined to the base and a free outer end away from the base, said body having recesses located exteriorly thereof generally at the junctures of the side members and the base with the recesses adapted to receive one die of the first pair and one die of the second pair, the span between the innermost portions of the recesses being less than the distance from the innermost portions of the recesses to the free outer ends of the side members, the distance between the innermost portions of the recesses being substantially the same as the distance between the outer surfaces of the side members adjacent their free ends, said side members being adapted for respective engagement adjacent their free ends by the other die of the first pair and the other die of the second pair.

8. A connector comprising in its uncrimped state a body formed of a malleable material, said body having a substantially U-shaped cable groove therein defined by a base and side members integral therewith, said side members each having an end joined to the base and a free outer end away from the base, the outer surfaces of said side members tapering from said base and the inner surfaces thereof being generally parallel, and a pair of generally parallel spaced recesses extending in a direction generally parallel to the cable groove and arranged generally at the junctures of the outer surfaces of the side members with the base, the distance between the innermost portions of said recesses being less than the distance from the innermost portions of the recesses to the free ends of the side members, the distance between the innermost portions of the recesses being substantially the same as the distance between the outer surfaces of the side members adjacent their free ends.

9. A connector for use with a crimping tool having four dies, said connector in its uncrimped state comprising a body formed of a malleable material and having a substantially U-shaped cable groove therein defined by a base and generally parallel side members integral therewith, said side members each having an end joined to the base and a free outer end away from the base, the outer surfaces of said side members tapering from said base and the inner surfaces defining the cable groove being substantially parallel, and an indentation formed in the outer surface of said base generally adjacent the juncture of each side member therewith, the span between the innermost portions of the indentations being less than the distance from the innermost portions of the indentations to the free outer ends of the side members, the distance between the innermost portions of the indentations being substantially the same as the distance between the outer surfaces of the side members adjacent their free ends whereby the crimping tool is adapted to be positioned with two dies being received by said indentations and two dies in contact with the outer surfaces of the side members adjacent their free ends.

10. A connector for use with a crimping tool having two pairs of oppositely directed dies operable to effect a generally cruciform crimp, said connector in its uncrimped state comprising a body formed of a malleable material and having a substantially U-shaped cable groove therein defined by a base and a pair of spaced side members integral therewith, said side members each having an end joined to the base and a free outer end away from the base, the outer surfaces of said side members tapering from said base and the inner surfaces defining the groove being substantially parallel, and an indentation in the outer surface of said body generally adjacent the juncture of each side member with the base and being defined by a pair of generally flat surfaces joining each other at an included angle of approximately 120°, the innermost portions of the indentations being spaced frrom each other less than the distance from the innermost portions of the indentations to the respective adjacent free ends of the side members, the distance between the innermost portions of the indentations being substantially the same as the distance between the outer surfaces of the side members adjacent their free ends whereby the crimping tool is adapted to be positioned with one die of each oppositely directed pair of dies fitting in said indentations and the other die of each pair in contact with the outer surfaces of the side members adjacent their free ends.

11. In a connector formed of a malleable material and adapted to be crimped by a compression crimping tool about a cable in the shape generally of a cruciform in cross section, a body having in its uncrimped state a substantially U-shaped cable groove therein defined by a base and a pair of spaced side members integral therewith, said side members each having an end joined to the base and a free outer end away from the base, the outer surfaces of said side members tapering from said base and the inner surfaces thereof defining the groove being generally parallel whereby the transverse dimension of said base is greater than the distance between the outer surfaces of the side members adjacent their free ends, and an indentation in the outer surface of said base generally adjacent the juncture of each side member therewith, the innermost portions of the indentations being on a line substantially in alignment with the bottom of the cable groove and adapted each to receive a die of said crimping tool.

12. A connector formed of a malleable material and adapted to be crimped about a cable, said connector comprising in its uncrimped state a body having a substantially U-shaped cable groove therein defined by a base and a pair of spaced side members integral therewith, said side members each having an end joined to the base and a free outer end away from the base, the outer surfaces of said side members tapering from said base and the inner surfaces thereof defining the groove being generally parallel whereby the transverse dimension of said base is greater than the distance between the outer surfaces of the side members adjacent their free outer ends, and an indentation in the outer surface of said base generally adjacent the juncture of each side member therewith, the distance between the innermost portions of the indentations being less than the distance from the innermost portions of said indentations to the respective outer free ends of the side members, the distance between the innermost portions of the indentations being substantially the same as the distance between the outer surfaces of the side members adjacent their free ends whereby separate dies of a crimping tool may be positioned substantially simultaneously in the indentations and on the outer surfaces of the side members, each of said side members being divided into at least two crimping sections by a slot opening at its free end and extending toward the base with the dimension of each section in the direction of the cable groove being such that upon crimping each section may be easily folded individually by a crimping tool about a cable in the cable groove to encase and tightly grip said cable.

13. In a cable connector adapted for being crimped by means of a crimping tool having two pairs of oppositely directed dies operable to effect a generally cruciform crimp, said connector in its uncrimped state comprising a body having a substantially U-shaped cable groove therein defined by a base and a pair of spaced parallel side members integral therewith, said side members each having an end joined to the base and a free outer end away from the base, the outer surfaces of said side members tapering from said base and the inner surfaces thereof which define the groove being generally parallel, and a recess in the outer surface of said base generally adjacent the juncture of each side member therewith, the span between the innermost portions of the recesses being slightly less than the distance from the innermost portions of the recesses to the respective outer free ends of the side members and substantially the same as the distance between the outer surfaces of the side members adjacent said outer free ends, each side member having at least one slot opening at its free end and extending toward the base to divide each side member into at least two crimping sections, the dimension of each crimping section in the direction of the cable groove being such that each section may be individually crimped by the dies of the crimping tool whereby each crimping section may be easily folded about a cable in the cable groove to encase and tightly grip the cable and to form along with the base a plurality of longitudinally extending ribs about the circumference of the cable.

14. A connector as set forth in claim 13 in which the body is T-shaped with a portion thereof having said cable groove therein.

15. A connector as set forth in claim 14 in which said portion of said T-shaped body comprises the leg thereof.

16. A connector as set forth in claim 13 in which the body is L-shaped with each leg thereof having a substantially U-shaped cable groove therein.

17. A connector as set forth in claim 13 in which the body has a pair of substantially U-shaped cable grooves arranged in parallel offset relation to each other.

18. A connector as set forth in claim 13 in which each of the base recesses is defined by a pair of generally flat surfaces joining each other at an included angle of approximately 120°.

References Cited by the Examiner

UNITED STATES PATENTS

| | | | |
|---|---|---|---|
| D. 186,662 | 11/59 | Sylvestor | 174—71 |
| D. 193,849 | 10/62 | Gibson | 174—94 |
| 1,692,218 | 11/28 | McIntosh | 24—123 |
| 2,327,651 | 8/43 | Klein | 287—75 |
| 2,707,775 | 5/55 | Hoffman et al. | 174—94 X |
| 2,759,256 | 8/56 | Bergan | 287—75 |
| 2,895,002 | 7/59 | Dupre et al. | 174—71 |
| 2,907,814 | 10/59 | Raila et al. | 29—518 |
| 3,001,000 | 9/61 | Wantz | 287—75 |
| 3,006,983 | 10/61 | McDurmont | 287—75 |
| 3,088,761 | 5/63 | Myers | 287—108 |
| 3,098,027 | 7/63 | Flower | 174—94 X |

FOREIGN PATENTS 709,041   8/41   Germany.

JOHN F. BURNS, *Primary Examiner.*

CARL W. TOMLIN, LARAMIE E. ASKIN, *Examiners.*